(12) United States Patent
Pan et al.

(10) Patent No.: US 10,461,534 B2
(45) Date of Patent: Oct. 29, 2019

(54) STARTING METHOD AND STOPPING METHOD FOR A STATIC SYNCHRONOUS SERIES COMPENSATOR

(71) Applicants: NR ELECTRIC CO., LTD, Nanjing, Jiangsu (CN); NR ENGINEERING CO., LTD, Nanjing, Jiangsu (CN)

(72) Inventors: Lei Pan, Jiangsu (CN); Jie Tian, Jiangsu (CN); Quanrong Shen, Jiangsu (CN); Xinbao Wang, Jiangsu (CN); Yu Lu, Jiangsu (CN); Yunlong Dong, Jiangsu (CN); Baoli Chang, Jiangsu (CN)

(73) Assignees: NR ELECTRIC CO., LTD, Nanjing, Jiangsu (CN); NR ENGINEERING CO., LTD, Nanjing, Jiangsu (CN)

( * ) Notice: Subject to any disclaimer, the term of this patent is extended or adjusted under 35 U.S.C. 154(b) by 364 days.

(21) Appl. No.: 15/501,996

(22) PCT Filed: Aug. 4, 2015

(86) PCT No.: PCT/CN2015/086037
§ 371 (c)(1),
(2) Date: Feb. 6, 2017

(87) PCT Pub. No.: WO2016/019853
PCT Pub. Date: Feb. 11, 2016

(65) Prior Publication Data
US 2017/0229865 A1   Aug. 10, 2017

(30) Foreign Application Priority Data
Aug. 5, 2014 (CN) .......................... 2014 1 0382833

(51) Int. Cl.
*H02J 3/00* (2006.01)
*H02M 1/36* (2007.01)
*H02J 3/18* (2006.01)

(52) U.S. Cl.
CPC .............. *H02J 3/00* (2013.01); *H02J 3/1807* (2013.01); *H02M 1/36* (2013.01); *Y02E 40/10* (2013.01)

(58) Field of Classification Search
CPC .............................. H02J 3/1807; H02J 3/1814
See application file for complete search history.

(56) References Cited

U.S. PATENT DOCUMENTS

| 2005/0012395 A1* | 1/2005 | Eckroad | H02J 3/16 307/44 |
|---|---|---|---|
| 2005/0071050 A1* | 3/2005 | Chow | G05F 1/70 700/286 |
| 2008/0258559 A1* | 10/2008 | Berggren | H02J 3/06 307/31 |

FOREIGN PATENT DOCUMENTS

| CN | 102969708 A | 3/2013 |
|---|---|---|
| CN | 103036186 A | 4/2013 |

(Continued)

OTHER PUBLICATIONS

CN103280799 and translation (Year: 2013).*

(Continued)

*Primary Examiner* — Jared Fureman
*Assistant Examiner* — Joel Barnett
(74) *Attorney, Agent, or Firm* — Ladas & Parry LLP

(57) ABSTRACT

A starting and stopping method for a static synchronous series compensator (SSSC) is provided. A starting process includes: connecting a converter to a shunt transformer, and closing a breaker which connect the AC system and the shunt transformer to charge the converter until the DC voltage is stable; opening the breaker, and connecting the converter to a series transformer through a change-over switch; and deblocking the converter, and controlling a current of a bypass switch of the series transformer to approach zero. A stopping process includes: switching a (Continued)

control mode of the converter to make the current of the bypass switch approaches zero when closed the bypass switch, then controlling a current of the series transformer to be gradually reduced to zero to make the series transformer out of service, and blocking the converter.

17 Claims, 2 Drawing Sheets

(56) References Cited

FOREIGN PATENT DOCUMENTS

| | | |
|---|---|---|
| CN | 103280799 A | 9/2013 |
| CN | 103414185 A | 11/2013 |
| CN | 104134998 A | 11/2014 |

OTHER PUBLICATIONS

NYPA Convertible Static Compensator (CSC) Application Phase I: STATCOM by Uzuovic et al. 2001 IEEE/PES Transmission and Distribution Conference and Exposition. Oct. 28-Nov. 2, 2001. (Year: 2001).*
International Search (ISR) with English translation and Written Opinion (WO) dated Oct. 29, 2015 for International Application No. PCT/CN2015/086037.
Espacenet English abstract of CN 103280799 A.
Espacenet English abstract of CN 103036186 A.
Espacenet English abstract of CN 104134998 A.
Espacenet English abstract of CN 103414185 A.
Espacenet English abstract of CN 102969708 A.

* cited by examiner

STARTING METHOD AND STOPPING METHOD FOR A STATIC SYNCHRONOUS SERIES COMPENSATOR

RELATED APPLICATION

This application is an application under 35 U.S.C. 371 of International Application No. PCT/CN2015/086037 filed on Aug. 4, 2015, the entire contents of which are incorporated herein by reference.

BACKGROUND OF THE INVENTION

Field of the Invention

The present invention relates to flexible alternating-current power transmission technologies, and more particularly to a starting and stopping method for an SSSC.

Description of Related Art

As large-scale electric power systems are interconnected and various new devices are used, while power generation and power transmission become more economical and more efficient, the scale and complexity of an electric power system is increased. Furthermore, a large quantity of distributed power generation systems are connected to a grid, a conventional fixed power flow of transmission from a power transmission network to a power distribution network is reversed. As user load keeps growing, a power flow control measure is required to improve an existing power transmission capability. Complex power exchange between intelligent grids that are developing vigorously and an electric power market requires frequent power flow control.

A static synchronous series compensator (SSSC) is a relatively common flexible power transmission device that is used to improve a power transmission capability and a regulation capability of a system. A principle of the SSSC is to inject, into a line to which it is connected in series, a voltage whose magnitude is not related to a line current and whose phase is perpendicular to the phase of the line current, and changing the magnitude of the voltage is equivalent to changing the effective impedance of the line, so that a power flow of the system can be controlled. Because the SSSC is a compensation device based on power electronics, sub-synchronous resonance (SSR) in fixed series compensation and controllable series compensation will not occur. An SSSC does not differ much from a unified power flow controller (UPFC) in terms of power flow control and system stability enhancement. However, the number of power electronics used in an SSSC is only half of that in a UPFC, and a cost of an SSSC is much lower than that of a UPFC that has the same control capability.

There are no separate SSSC projects abroad either. However, there are project applications of an operation mode in which an SSSC is used as a part of a UPFC project. At present, more research in China mainly focuses on control strategies of SSSCs and control functions such as power flow control and system oscillation damping, and relatively few studies have been done on starting and stopping modes of SSSCs. A common SSSC includes a converter, one or more series transformers, and a bypass switch of the series transformer. A general starting mode has the steps of: opening the bypass switch of the series transformer, putting the series transformer in use, charging the converter, then deblocking the converter according to a set control mode, thereby completing the starting; or, charging a capacitor of the converter through a direct-current power supply, then deblocking the converter, opening the bypass switch of the transformer, thereby completing the starting; and when it is desired to stop the SSSC, first, blocking the converter, and then making the transformer exit. In such a starting and stopping mode, when the series transformer is put in use but the converter is blocked, an excessively high voltage is generated at the transformer and the converter, the transformer is even saturated, and at the same time the capacitor of the converter is overcharged, which affects the safety of the converter. In addition, at the instant when the transformer is put in use and exits, a line current also changes drastically, which severely affects a power flow of an alternating-current system.

To solve the deficiencies in the starting and stopping mode above, to improve the stability and reliability of starting and stopping of an SSSC, and to make full use of the advantages of an SSSC, there is a need for a starting and stopping mode that is more stable and more suitable for project applications.

SUMMARY OF THE INVENTION

Technical Problem

An objective of the present invention is to provide a starting and stopping method for an SSSC. By using the starting and stopping method, a direct-current overvoltage and a direct-current overcurrent of a converter when the converter is being deblocked and blocked and when a series transformer is put into use and exits can be effectively suppressed, and current oscillation of a series-side alternating-current line and impact on the series transformer can be reduced, thereby achieving stable starting and stopping of an SSSC and improving the stability and reliability of a system.

Technical Solution

To achieve the foregoing objective, the solutions of the present invention are as follows:

A starting method for an SSSC, the SSSC including a converter, a shunt transformer, a series transformer, and at least one bypass switch of the series-side transformer, the starting method including the following steps:

(a1) setting an initial status of starting the SSSC: the converter is disconnected from both the shunt transformer and the series transformer, the bypass switch of the series transformer is closed, and an incoming line switch of the shunt transformer is opened;

(a2) connecting the converter to the shunt transformer, closing the incoming line switch of the shunt transformer, and charging the converter, entering step (a3) after the charging ends;

(a3) disconnecting the converter from the shunt transformer, and connecting the converter to the series transformer, entering step (a4) after stabilization;

(a4) deblocking the converter in a zero current control mode of the bypass switch;

(a5) controlling a current of the bypass switch of the series transformer to be gradually reduced below a current threshold, and opening the bypass switch of the series transformer; and (a6) after the line is stably operated, enabling the SSSC to enter a normal operation mode, thereby completing a starting process.

A stopping method for an SSSC, the SSSC including a converter, a series transformer, and at least one bypass switch of the series-side transformer, the stopping method including the following steps:

(b1) switching the converter to a zero current control mode of the bypass switch, entering step (b2) after stabilization;

(b2) closing the bypass switch of the series transformer, entering step (b3) after stabilization;

(b3) controlling a current of the series transformer to be gradually reduced below a current threshold, entering step (b4) after stabilization; and (b4) blocking the converter, and making the series transformer out of service from an alternating-current line, thereby completing a stopping process.

Further, if a start circuit is connected in series on a valve side of the shunt transformer, in the starting step (a2), the start circuit is first put in use before closing the incoming line switch of the shunt transformer, and the start circuit then exits after the charging ends.

Further, the foregoing start circuit connected in series includes a resistor and a switch that are connected in parallel.

Further, the foregoing connection is implemented by using a mechanical switch or a switch that is formed of power electronics. Further, the foregoing starting and stopping method is applicable to the following voltage source converter topologies, including, but not limited to, a two-level topology, a three-level topology, a multi-transformer topology, or a modular multi-level topology.

Further, the zero current control mode of the bypass switch in the starting step (a4) and the stopping step (b1) is used to control the current that flows through the bypass switch to approach zero.

Further, in the foregoing starting steps (a4) and (a5) and stopping steps (b1) and (b2), the bypass switch of the series transformer is a mechanical switch or a switch that is formed of power electronics.

Further, the current threshold in the foregoing starting step (a5) and stopping step (b3) is an allowable maximum current value for the bypass switch of the series transformer to be normally opened.

Further, the foregoing starting and stopping method is applicable to an interline power flow controller, at least one converter is connected to a shunt transformer, and starting and stopping are performed according to the foregoing steps.

Advantageous Effect

Through the foregoing solutions, the present invention can achieve stable starting and stopping of an SSSC. In starting, after charging of a converter by a shunt transformer ends, the converter is deblocked in a zero current control mode of a bypass switch; after a current of the bypass switch approaches zero and substantially all of a line current flows through a series transformer, the bypass switch is opened. In this way, when the series transformer is put in use, there is no impact on the transformer and the converter, and there is basically no effect on an alternating-current system, thereby achieving stable connection of the SSSC. In stopping, first, the converter is switched to the zero current control mode of the bypass switch, so that when the bypass switch is put in use, there is basically no disturbance on a line; after the bypass switch is put in use, a current of the series transformer is further controlled to be gradually reduced to approach zero, to enable the series transformer to exit stably, and then the converter is blocked. There is basically no disturbance in the alternating-current system and the converter. By using the foregoing starting and stopping solution, the stability and reliability of an SSSC can be improved.

DETAILED DESCRIPTION OF THE INVENTION

The following detailed description of the present invention is made with reference to the accompanying drawings.

Figure 1:
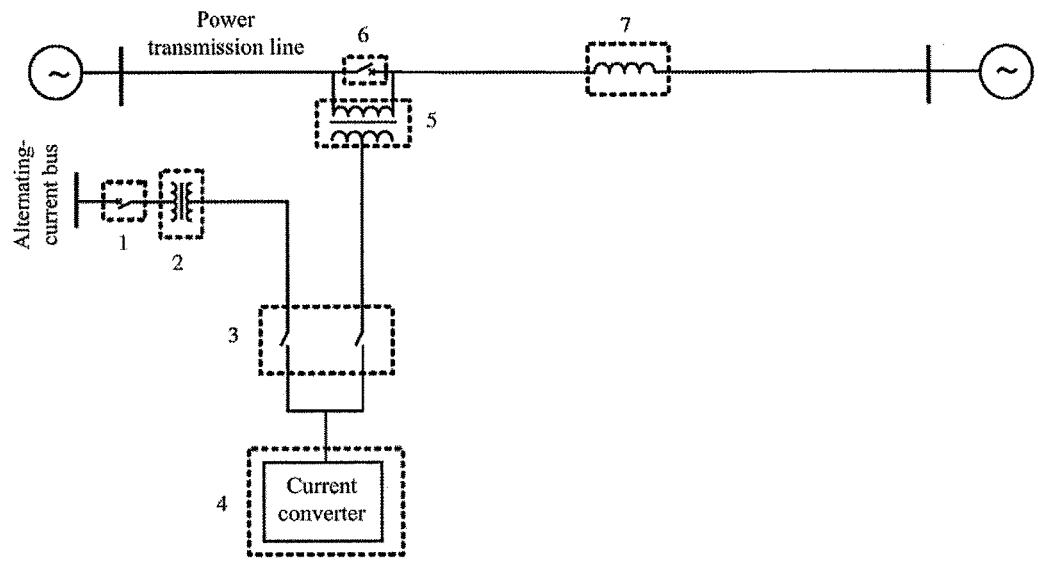
FIG. 1 is a single-phase equivalent structural diagram of an SSSC according to an embodiment of the present invention.

The present invention provides a starting and stopping method for an SSSC. The SSSC is shown in FIG. 1. In FIG. 1, 1 represents an incoming line switch of a shunt transformer, 2 represents the shunt transformer, 3 represents a change-over switch, 4 represents a converter, 5 represents a series transformer, 6 represents a bypass switch connected in parallel to a line-side winding of the series transformer, and 7 represents a reactance such as a line value. An alternating-current side of the converter 4 is respectively connected to the shunt transformer 2 and the series transformer 5 through the change-over switch 3.

Figure 3:
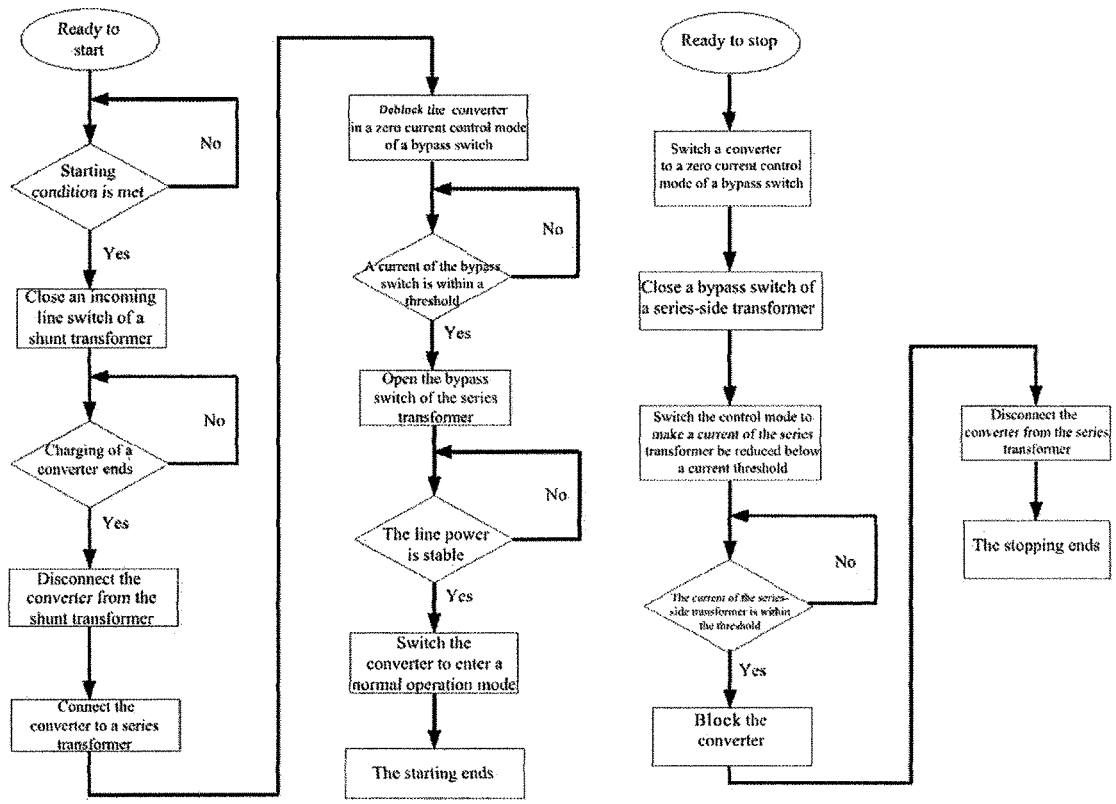
FIG. 3 is a flowchart of starting and stopping according to the present invention.

FIG. 3 is a flowchart of starting and stopping modes an SSSC according to the present invention.

Figure 2:
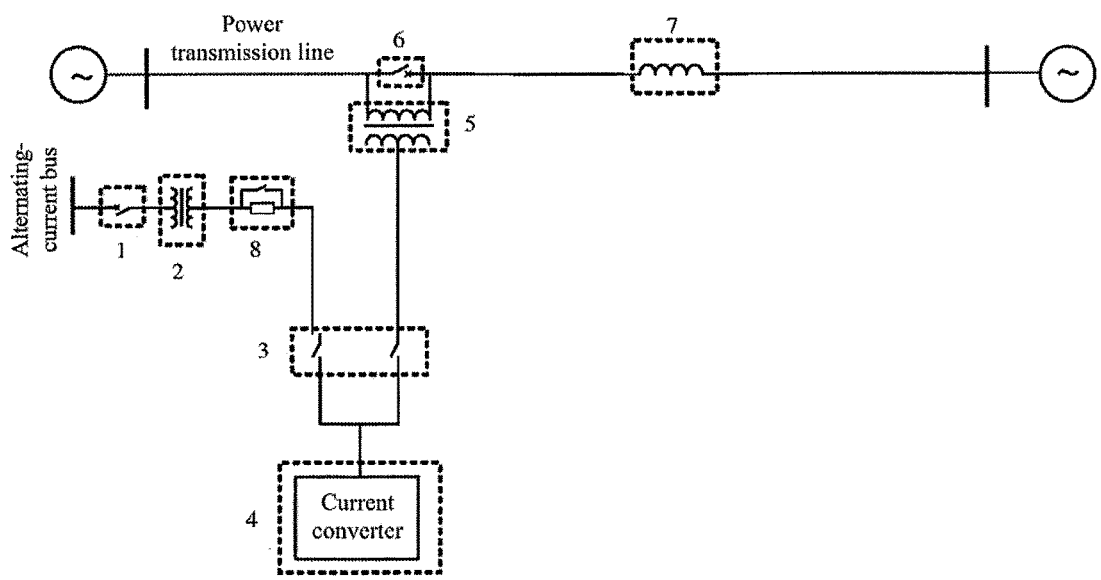
FIG. 2 is a single-phase equivalent structural diagram of an SSSC after a start circuit is added according to an embodiment of the present invention.

The starting method has the steps of: first, connecting the converter 4 to an alternating-current system through the shunt transformer 2 for charging, then connecting the converter 4 to the series transformer 5, deblocking the converter 4, and then putting the series transformer 5 in use. The starting steps are as follows:

(a1) setting an initial status of starting the SSSC: the converter 4 is disconnected from both the shunt transformer 2 and the series transformer 5, the bypass switch 6 of the series transformer is closed, and the incoming line switch 1 of the shunt transformer is opened;

(a2) connecting the converter 4 to the shunt transformer 2, closing the incoming line switch 1 of the shunt transformer, and charging the converter 4 in an uncontrolled manner, entering step (a3) after the charging ends;

as shown in FIG. 2 according to another embodiment of the present invention, a start circuit 8 may be connected in series on a valve side of the shunt transformer 2, the start circuit 8 is first put in use before closing the incoming line switch 1 of the shunt transformer, so as to reduce impact on the converter 4 when the shunt transformer 2 is put in use, and the start circuit 8 exits after the shunt transformer 2 is put in use; the start circuit 8 that is connected in series includes a resistor and a switch that are connected in parallel;

(a3) disconnecting the converter 4 from the shunt transformer 2, and connecting the converter 4 to the series transformer 5, entering step (a4) after stabilization;

(a4) deblocking the converter 4 in a zero current control mode of the bypass switch;

(a5) controlling a current of the bypass switch of the series transformer 5 to be gradually reduced below a current threshold, and opening the bypass switch 6 of the series transformer; and (a6) after the line is stably operated, enabling the SSSC to enter a normal operation mode, thereby completing a starting process.

The stopping method includes the following steps:

(b1) switching the converter 4 to a zero current control mode of the bypass switch, entering step (b2) after stabilization;

(b2) closing the bypass switch 6 of the series transformer, entering step (b3) after stabilization;

(b3) controlling a current of the series transformer 5 to be gradually reduced below a current threshold, entering step (b4) after stabilization; and (b4) blocking the converter 4, and making the series transformer 5 out of service from an alternating-current line, thereby completing a stopping process.

The foregoing connection is implemented by using a mechanical switch or a switch that is formed of power electronics, for example, the change-over switch 3 shown in FIG. 1 and FIG. 2.

The foregoing starting and stopping method is applicable to an SSSC using various voltage source converter topologies such as a two-level topology, a three-level topology, a multi-transformer topology, or a modular multi-level topology.

The zero current control mode of the bypass switch in the foregoing starting step (a4) and stopping step (b1) is used to control the current that flows through the bypass switch to approach zero.

In the foregoing starting steps (a4) and (a5) and stopping steps (b1) and (b2), the bypass switch 6 of the series transformer may be a mechanical switch or a switch that is formed of power electronics.

In this embodiment, the current threshold in the starting step (a5) and the stopping step (b3) is an allowable maximum current value for the bypass switch 6 of the series transformer to be normally opened. For different projects or different bypass switches, the current thresholds are different, which is well-known in the art and a description thereof will be omitted.

The foregoing starting and stopping method is applicable to an interline power flow controller, at least one converter is connected to a shunt transformer, and starting and stopping are performed according to the foregoing steps.

It should be noted that the elements such as reactors, resistors, and switches in the present invention mostly refer to equivalent elements. That is, equivalent elements in a circuit structure may be separate elements, or may be formed of multiple same elements that are cascaded (in series or in parallel). For any equivalent element in the embodiments of the present invention, any equivalent circuit that can implement the same function should fall within the protection scope of the embodiments of the present invention.

Finally, it should be noted that the foregoing embodiments are only used to describe the technical solutions of the present invention rather than to limit the present invention. It should be understood that changes or equivalent substitutions can be made to the detailed description of the present invention by a person skilled in the art. However, these changes or variations all fall within the scope of the claimed patent.

What is claimed is:

1. A starting method for a static synchronous series compensator (SSSC), the SSSC consisting essentially of a converter, a shunt transformer, a series transformer, and at least one bypass switch of the series transformer, wherein the shunt transformer is connected to an alternating-current line on one end and to the current converter on another end, wherein the shunt transformer comprises an incoming line switch connected to the alternating-current line, wherein the series transformer is connected to the current converter on one end and to a transmission line on another end, wherein the at least one bypass switch is connected to the series transformer and to the transmission, the starting method comprising the following steps:

(a1) setting an initial status of starting the SSSC;

(a2) connecting the converter to the shunt transformer, closing an incoming line switch of the shunt transformer, and charging the converter, entering step (a3) after the charging ends;

(a3) disconnecting the converter from the shunt transformer, and connecting the converter to the series transformer, entering step (a4) after current or voltage stabilization;

(a4) deblocking the converter in a zero current control mode of the bypass switch;

(a5) controlling a current of the bypass switch of the series transformer to be gradually reduced below a current threshold, and opening the bypass switch of the series transformer; and (a6) after the transmission line is stably operated, enabling the SSSC to enter a normal operation mode, thereby completing a starting process.

2. The starting method for an SSSC according to claim 1, wherein setting the initial status in step (a1) comprises: disconnecting the converter from both the shunt transformer and the series transformer, closing the bypass switch of the series transformer, and opening the incoming line switch of the shunt transformer.

3. The starting method for an SSSC according to claim 2, wherein the connection is implemented by using a mechanical switch or a switch that is formed of power electronics.

4. The starting method for an SSSC according to claim 1, wherein the connection is implemented by using a mechanical switch or a switch that is formed of power electronics.

5. The starting method for an SSSC according to claim 1, wherein if a start circuit is connected in series on a valve side of the shunt transformer, in the starting step (a2), the start circuit is first put in use before closing the incoming line switch of the shunt transformer, and the start circuit then exits after the charging ends.

6. The starting method for an SSSC according to claim 5, wherein the start circuit connected in series comprises a resistor and a switch that are connected in parallel.

7. The starting method for an SSSC according to claim 1, wherein the starting method is applied to the following voltage source converter topologies, comprising, a two-level topology, a three-level topology, a multi-transformer topology, or a modular multi-level topology.

8. The starting method for an SSSC according to claim 1, wherein the zero current control mode of the bypass switch in the starting step (a4) is used to control the current that flows through the bypass switch to approach zero.

9. The starting method for an SSSC according to claim 1, wherein in the starting steps (a4) and (a5), the bypass switch of the series transformer is a mechanical switch or a switch that is formed of power electronics.

10. The starting method for an SSSC according to claim 1, wherein the current threshold in the starting step (a5) is an allowable maximum current value for the bypass switch of the series transformer to be normally opened.

11. The starting method for an SSSC according to claim 1, wherein the starting method is applied to an interline power flow controller comprising two SSSCs installed in two or more lines.

12. A stopping method for a static synchronous series compensator (SSSC), the SSSC consisting essentially of a converter, a shunt transformer, a series transformer, and at least one bypass switch of the series transformer, wherein the shunt transformer is connected to an alternating-current line on one end and to the current converter on another end, wherein the shunt transformer comprises an incoming line switch connected to the alternating-current line, wherein the series transformer is connected to the current converter on one end and to a transmission line on another end, wherein the at least one bypass switch is connected to the series transformer and to the transmission, the stopping method comprising the following steps:
- (b1) switching the converter to a zero current control mode of the bypass switch, entering step (b2) after current or voltage stabilization;
- (b2) closing the bypass switch of the series transformer, entering step (b3) after current or voltage stabilization;
- (b3) controlling a current of the series transformer to be gradually reduced below a current threshold, entering step (b4) after current or voltage stabilization; and
- (b4) blocking the converter, and making the series transformer out of service from the alternating-current line, thereby completing a stopping process.

13. The stopping method for an SSSC according to claim 12, wherein the starting and stopping method is applicable to the following voltage source converter topologies, comprising, a two-level topology, a three-level topology, a multi-transformer topology, or a modular multi-level topology.

14. The stopping method for an SSSC according to claim 12, wherein the zero current control mode of the bypass switch in the stopping step (b1) is used to control the current that flows through the bypass switch to approach zero.

15. The stopping method for an SSSC according to claim 12, wherein in the stopping steps (b1) and (b2), the bypass switch of the series transformer is a mechanical switch or a switch that is formed of power electronics.

16. The stopping method for an SSSC according to claim 12, wherein the current threshold in the stopping step (b3) is an allowable maximum current value for the bypass switch of the series transformer to be normally opened.

17. The stopping method for an SSSC according to claim 12, wherein the stopping method is applied to an interline power flow controller comprising two SSSCs installed in two or more lines.

* * * * *